(12) United States Patent
Artrip

(10) Patent No.: US 6,591,881 B2
(45) Date of Patent: Jul. 15, 2003

(54) AUTOMOBILE TIRE WITH REMOVABLE TREAD FILLERS AND TREAD CAVITIES BENEATH THE ROLLING SURFACE

(76) Inventor: Jerry Artrip, 164 Kaluna Ave., Bluff City, TN (US) 37618

( * ) Notice: Subject to any disclaimer, the term of this patent is extended or adjusted under 35 U.S.C. 154(b) by 99 days.

(21) Appl. No.: 09/932,683

(22) Filed: Aug. 20, 2001

(65) Prior Publication Data

US 2003/0034104 A1 Feb. 20, 2003

(51) Int. Cl.[7] .......................... B60C 1/00; B60C 11/00; B60C 11/13
(52) U.S. Cl. .................. 152/209.5; 152/209.17; 152/209.19
(58) Field of Search .................. 152/209.1, 209.5, 152/209.17, 209.19

(56) References Cited

U.S. PATENT DOCUMENTS

| | | | | |
|---|---|---|---|---|
| 1,876,016 A | * | 9/1932 | Pederson | |
| 2,148,343 A | * | 2/1939 | Flautt | |
| 2,272,891 A | * | 2/1942 | Coben | |
| 2,544,868 A | * | 3/1951 | Wallis | |
| 2,960,138 A | * | 11/1960 | Chiodo | |
| 6,408,910 B1 | * | 6/2002 | Lagnier et al. | |

FOREIGN PATENT DOCUMENTS

| | | | |
|---|---|---|---|
| GB | 24552 | * | 5/1913 |
| JP | 2-53617 | * | 2/1990 |

* cited by examiner

*Primary Examiner*—Steven D. Maki

(57) ABSTRACT

An automobile tire is so constructed that it produces new tread as the old tread is about worn out. A removable filler is located beneath the tread cavity of the new tire. When the tread is worn down to near an unsafe condition, the filler is removed which exposes new tread height.

5 Claims, 5 Drawing Sheets

AUTOMOBILE TIRE WITH REMOVABLE TREAD FILLERS AND TREAD CAVITIES BENEATH THE ROLLING SURFACE

Automobile tires are discarded when the tread is worn down such that the tires are suspected to hydroplane on wet highways. The remainder of the tire will continue to perform for years if said tire could receive new tread height. These billions of discarded tires have to be destroyed and replaced with new tires. New tread on the original tire is needed.

This inventor will build a tire that has extra tread depth and containing a removable filler moulded between the tread so that when the tread is worn down to within about 3/32 inch the fillers may be removed and the tire now has tread height like at least new tread condition.

When tread is again worn down to about 3/32 inch, a second filler may be removed and again the tire has tread height like at least new tread condition. The filler strips will have small protrusions pointing upward for grasping and removing the filler strips. Filler strips may run the circumference of the tire just under the tread cavity. Said strips may also run oblique or traverse to surface of tire but beneath tread cavity.

Also constructed is a tire that has tread cavities built downward of the surface of the tire and laterally displaced from the bases of the top tread cavities. These downward tread cavities only appear after the top tread cavities are almost worn out. Said cavities could be made to appear at any wear out height of original tread height by constructing the downward tread cavities at different distances from the surface of of the tire.

DETAILED DESCRIPTION OF INVENTION

Figure 1:
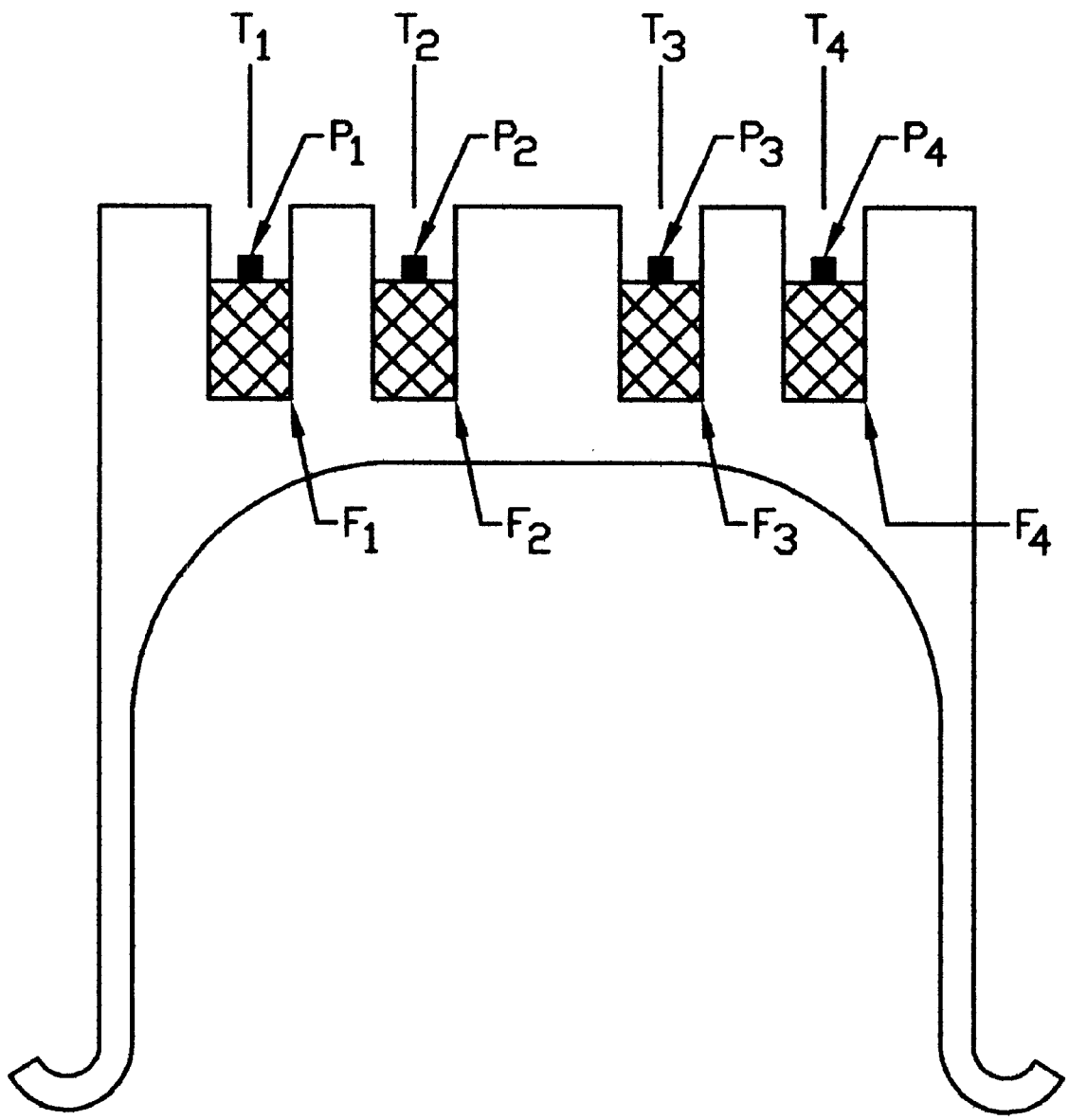
FIG. 1 shows a cross section of a tire with removable fillers beneath original circumferential tread cavities.

FIG. 1 shows a cross section of a tire with $T_1$, $T_2$, $T_3$ and $T_4$ as original tread cavities that run the outer circumference of the tire. $F_1$ to $F_4$ are removable fillers beneath the original circumferential tread cavities. $P_1$, $P_2$, $P_3$ and $P_4$ are pull tabs which will assist in removing the fillers. When the fillers $F_1$ to $F_4$ are removed, new cavities are formed.

Figure 2:
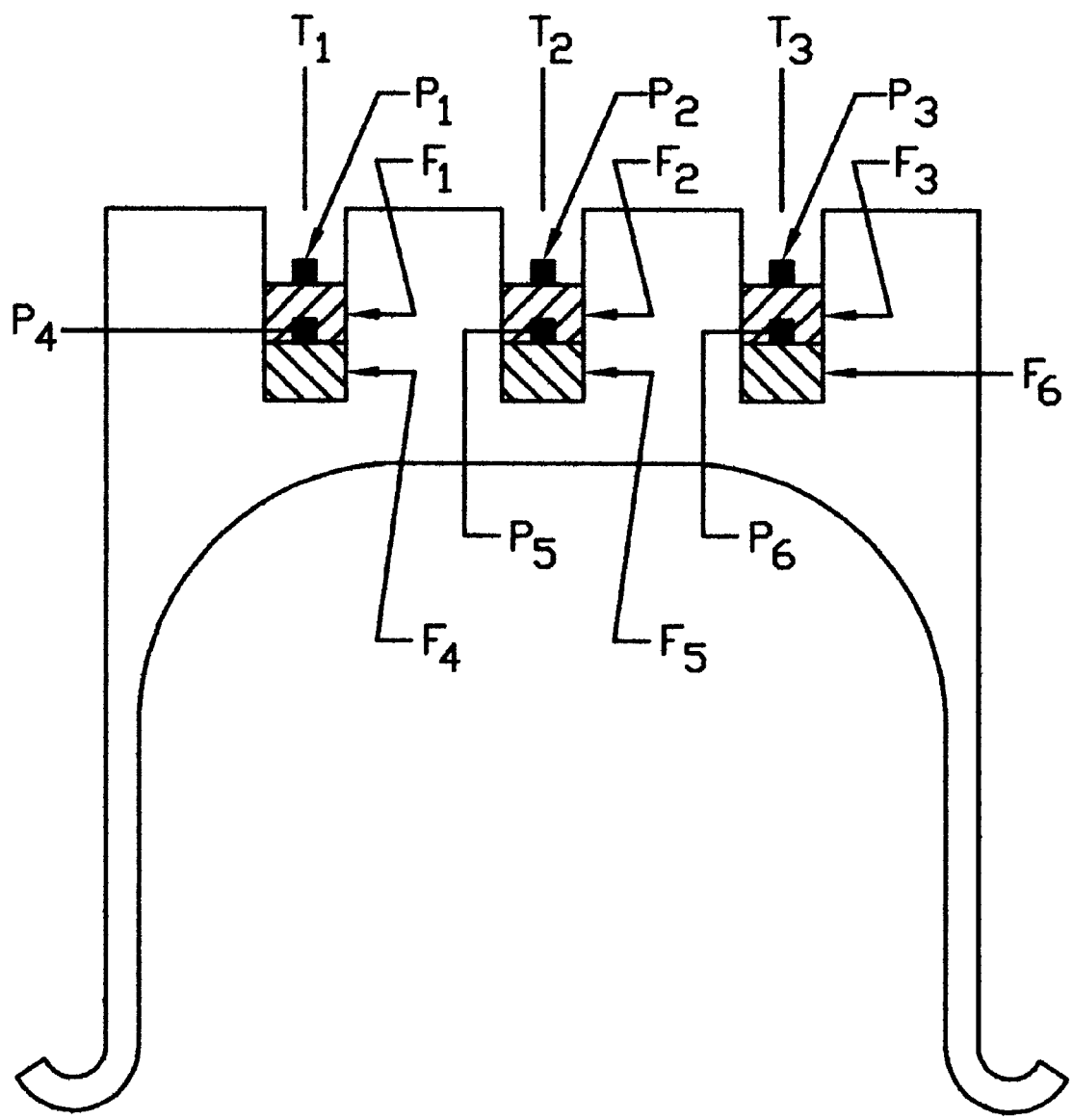
FIG. 2 shows a cross section of a tire with original circumferential tread cavities, first removable fillers and second removable fillers.

FIG. 2 shows a cross section of a tire with $T_1$, $T_2$, $T_3$ as original tread cavities that run the outer circumference of the tire. $F_1$, $F_2$ and $F_3$ are first removable fillers beneath the original circumferential trend cavities. $P_1$, $P_2$, and $P_3$ are pull tabs which assist in removing the first removable filers. When the fillers $F_1$ to $F_3$ are removed, first new cavities are formed. After the read is worn down, second removable fillers $F_4$, $F_5$ and $F_6$ are removed and second new tread cavities are formed. The first removable fillers $F_1$, $F_2$ and $F_3$ are located beneath the original tread cavities $T_1$, $T_2$ and $T_3$ respectively and the second removable fillers $F_4$, $F_5$ and $F_6$ are located directly beneath and contact the first removable fillers $F_1$, $F_2$ and $F_3$ respectively. The width of the first new tread cavity is equal to the width of the original tread cavity. The width of the second new tread cavity is equal to the width of the original tread cavity.

Figure 3:
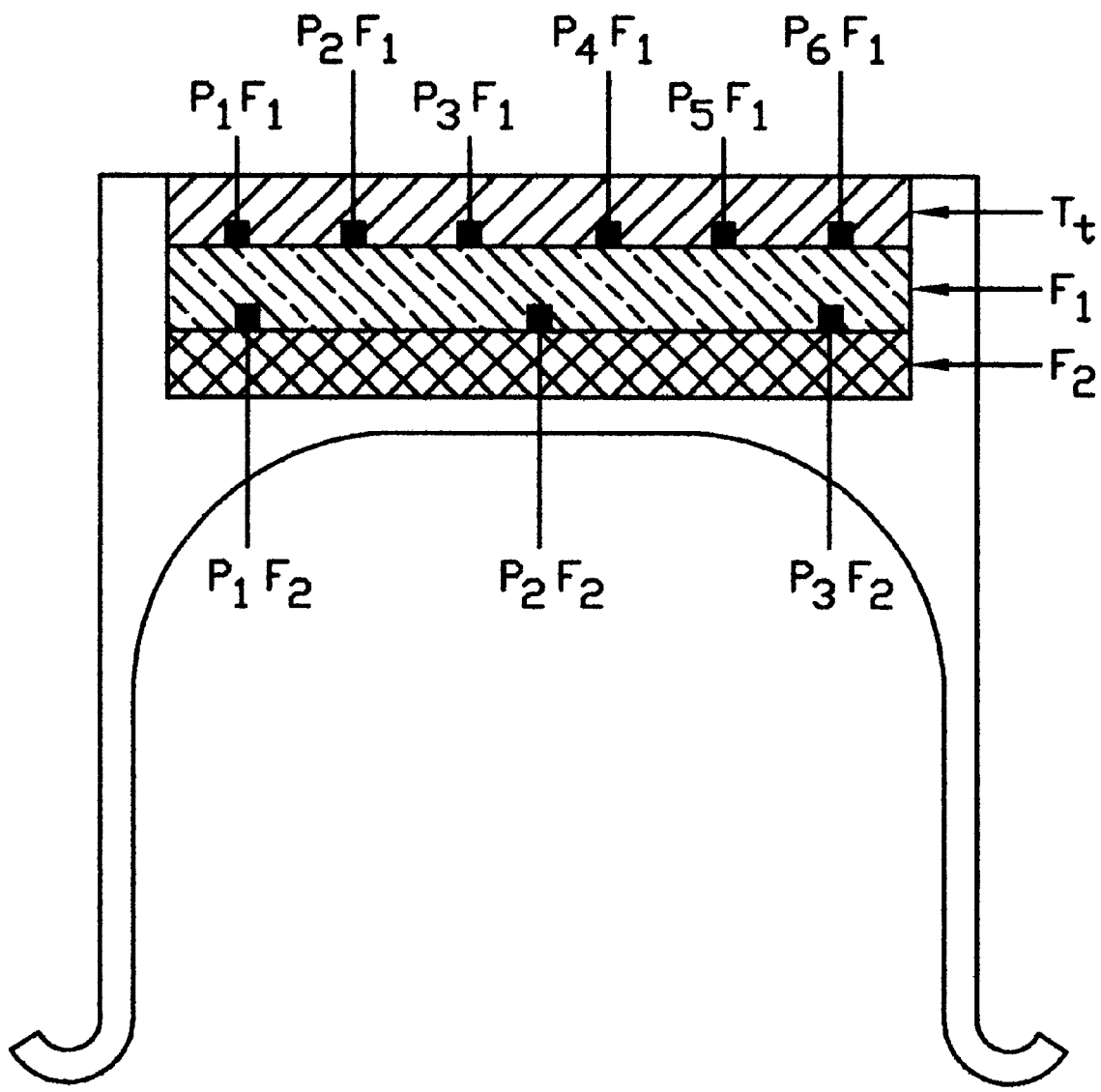
FIG. 3 shows a cross section of a tire with original transverse tread cavity, first removable filler and second removable filler.

FIG. 3 shows a cross section of a tire with original transverse tread cavity $T_t$ and first removable filler $F_1$ beneath the tread cavity $T_t$. Also shown is $P_1F_1$ to $P_6F_1$ which are pull tabs which will assist in removing filler $F_1$ to form a first new tread cavity. Also shown is second removable filler $F_2$ which can be removed when the tread is worn down using pull tabs $P_1F_2$, $P_2F_2$ and $P_3F_2$. Removing filler $F_2$ forms second new tread cavity and new tread height.

Figure 4:
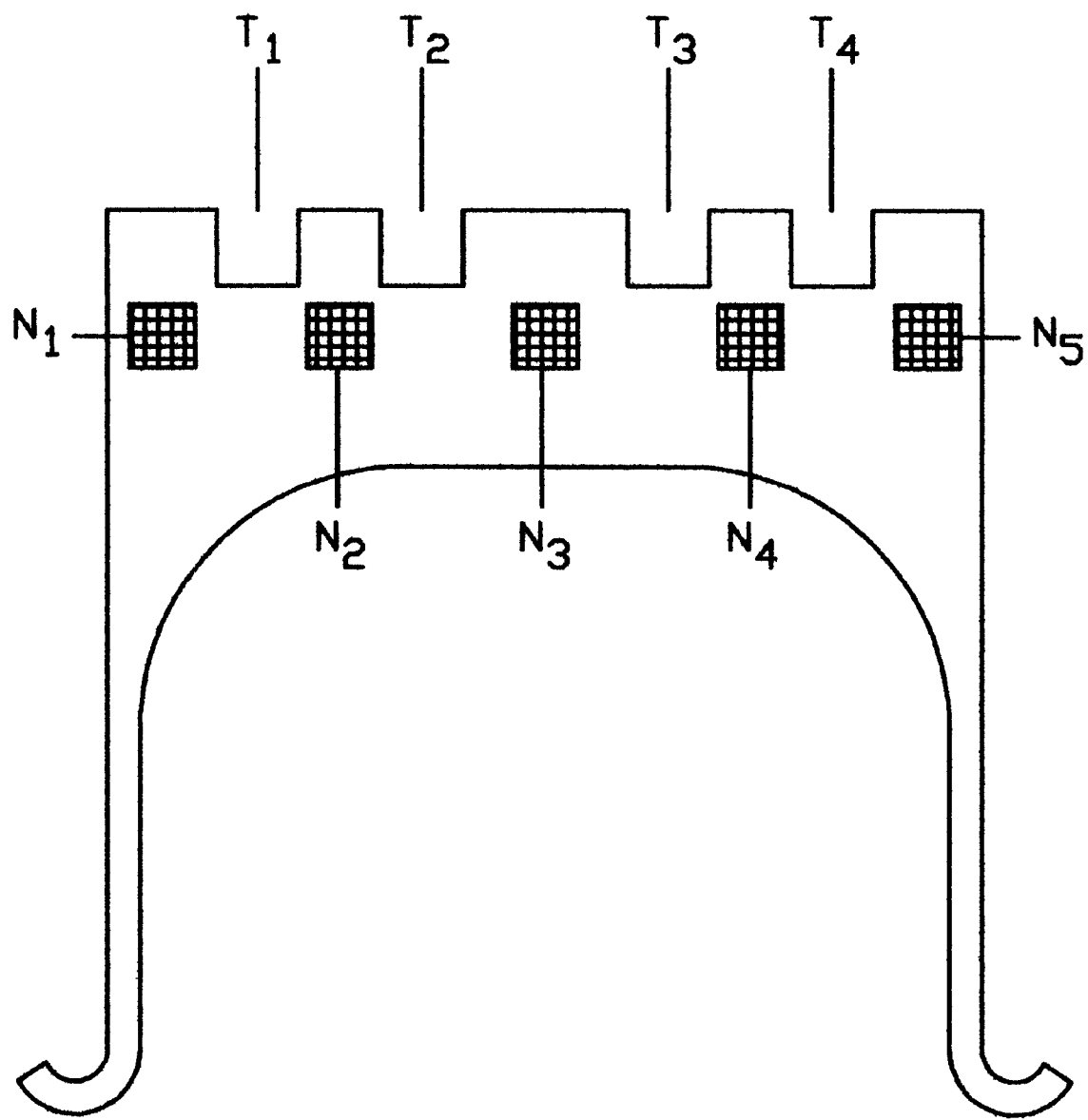
FIG. 4 shows a cross section of a tire with old tread cavities and new tread cavities.

FIG. 4 shows a cross section of a tire with tread cavities $T_1$, $T_2$, $T_3$, and $T_4$. Also shown are new tread cavities $N_1$ to $N_5$ whose crest is just above the base of tread cavities $T_1$ to $T_4$. This arrangement of the new tread cavities in relation to the old tread cavities allows for the new tread cavities to appear just before the old tread cavity is worn out. New tread has been produced with this invention.

Figure 5:
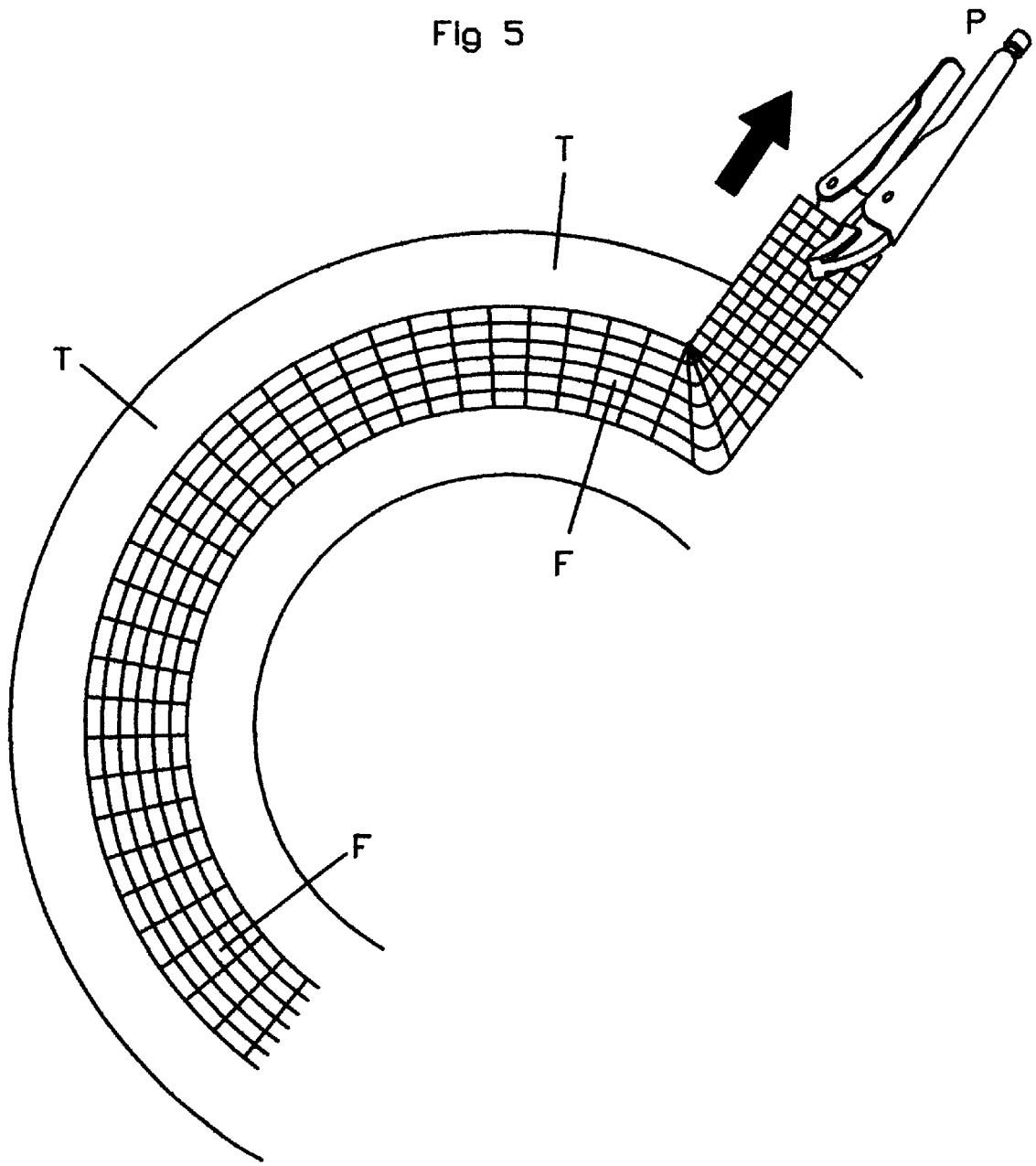
FIG. 5 shows part of the outer circumference of a tire having a filler strip.

FIG. 5 shows part of the outer circumference of a tire with tread T. Also shown is filler F which lies just below the bottom of original trend T. Also shown is P which is pulling the filler strip F out of the tire to produce a new trend cavity and new tread on the tire, Multiple filler strips F could be used.

INVENTION SUMMARY

Billions of automobile tires are made and when the tread is worn down such that the tire are suspected to hydroplane on wet highways the tires are discarded. The remainder of the tire is good and would continue to perform if it had tread. This invention is constructing a tire that has extra tread depth on the tire and containing a removable filler molded between the tread so that when the tread is worn down to within about 3/32 inch, then the fillers may be removed and the tire has like new tread. The filler strips support the original tread.

Attaining new tread after the original tread is worn or worn out can be attained. This invention constructs a tire that has a tread cavity built downward of the rolling surface of the tire and laterally displaced from the base of the first or upper tread cavity. This new tread only appears after the upper tread is almost worn out.

When new tread is produced on the tire it should last twice as long as present day tires. If tires last twice as long, then only one-half as many tires would need to be replaced when using this newly invented tire.

Since there are billions of tires to destroy a reduction of one-half of those would be an enormous figure in dollars. Even more money would be saved in purchasing one set of tires rather than two sets.

What is claimed:

1. A tire having a tread comprising
   at least one original cavity,
   a first removable filler located directly beneath the original tread cavity and a pull tab on the first removable file for removing the first removable filler from the tire to form a first new tread cavity,
   a second removable filler located directly beneath and contacting the first removable filler and a pull tab on the second removable filler for removing the second removable filler from the tire to form a second new tread cavity.

2. The tire of claim 1, wherein the original tread cavity extends in the circumferential direction of the tire.

3. The tire of claim 1, wherein the original tread cavity extends transverse to the circumferential direction of the tire.

4. The tire of claim 1, wherein the width of the first new tread cavity is equal to the width of the original tread cavity.

5. The tire of claim 1, wherein in the width of the second new tread cavity is equal to the width of the original tread cavity.

* * * * *